Feb. 19, 1963     J. T. IRWIN     3,077,786
GYRO SYSTEM MOUNT
Filed Feb. 4, 1960     4 Sheets-Sheet 1
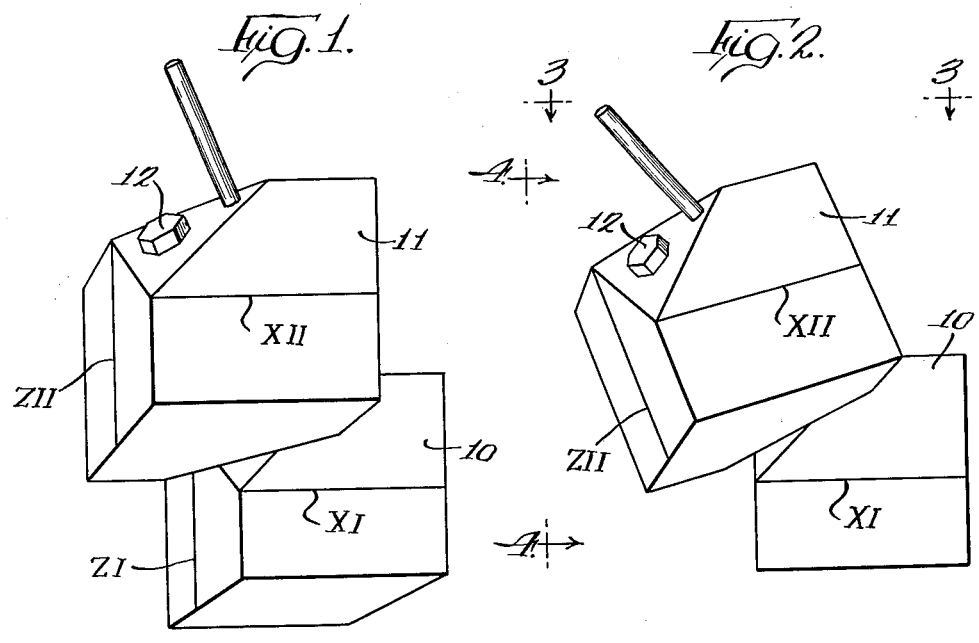
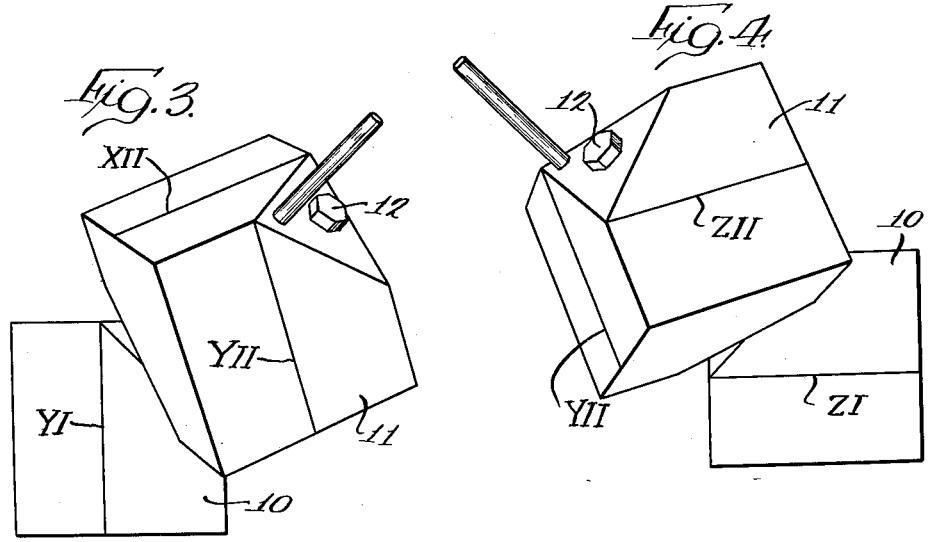
INVENTOR.
John T. Irwin
BY Hofgren, Brady,
Wegner, Allen & Stellman
Attys.

Feb. 19, 1963
J. T. IRWIN
3,077,786
GYRO SYSTEM MOUNT
Filed Feb. 4, 1960
4 Sheets-Sheet 2
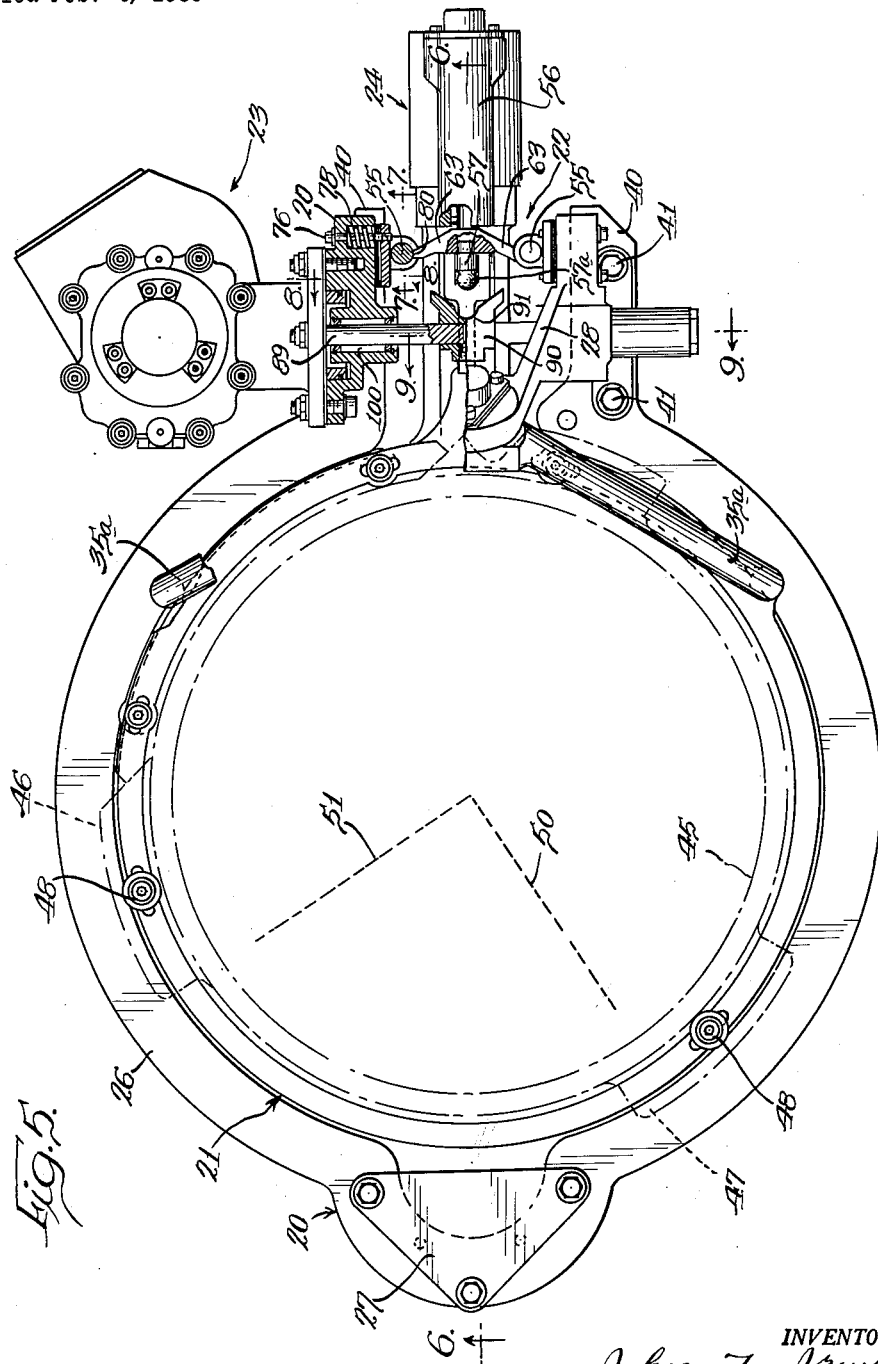
INVENTOR.
John T. Irwin
BY Hofgren, Brady,
Wegner, Allen & Stellman
Attys.

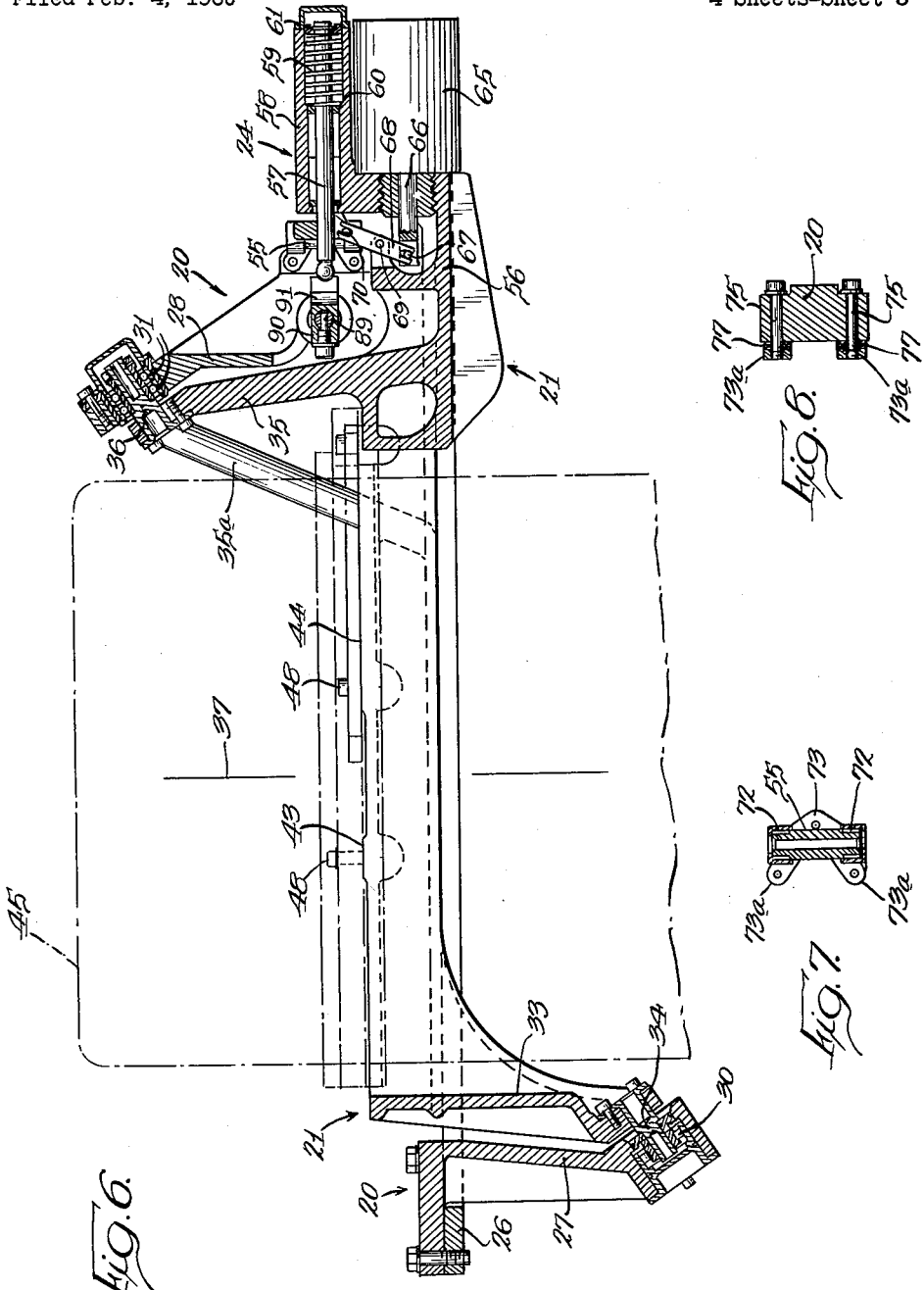

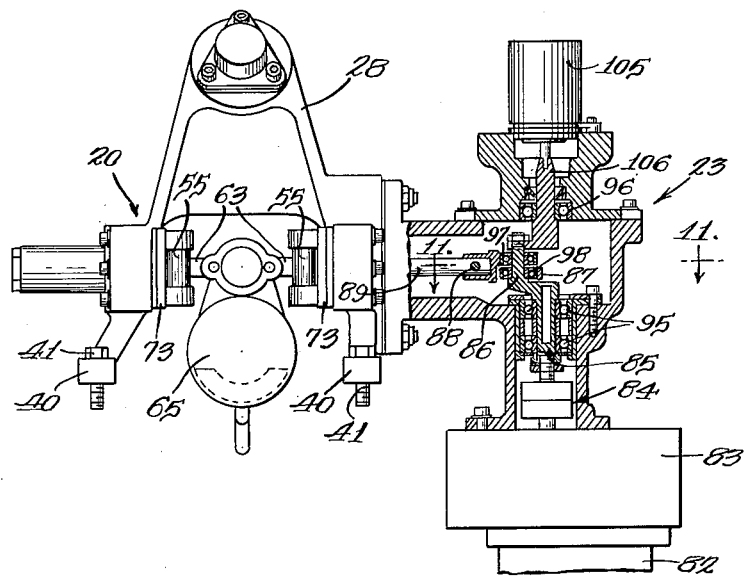
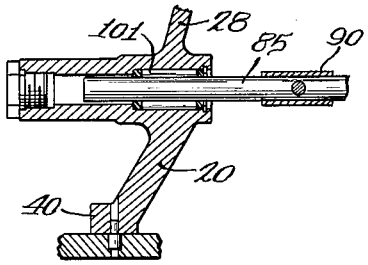
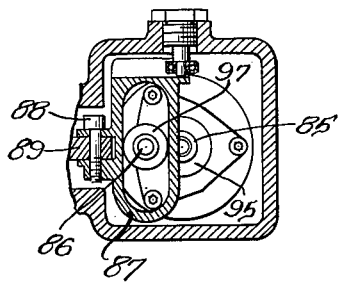

United States Patent Office 3,077,786
Patented Feb. 19, 1963

3,077,786
GYRO SYSTEM MOUNT
John T. Irwin, Westminster, Colo., assignor to Sundstrand Corporation, a corporation of Illinois
Filed Feb. 4, 1960, Ser. No. 6,794
11 Claims. (Cl. 74—5)

This invention relates to a mount for use in a missile or the like for supporting a housing containing a gyro system.

The term "gyro system" as used herein may be defined as a system having one or more gyros which are utilized to provide a read-out in terms of angular displacement of the missile axes, such as pitch, yaw and roll axes, from reference positions. Prior to launching of the missile, it is desirable to check the gyro system to determine that it is functioning accurately. The mount of this invention provides a movable support for a gyro system housing by which the housing may be tilted to provide simultaneous angular displacement of each of the three principal axes of the gyro system for the purpose of checking the system, after which the housing may be returned to and locked in a reference position.

It is a general object of the invention to provide a new and improved mount of the type described.

Another object is to provide a new and improved mount of the type described including a mounting ring having a generally planar and annular mounting surface for supporting a gyro system housing, and means mounting the ring for oscillation about an axis inclined to the axis of and the plane of the mounting surface, whereby a gyro system housing may be positioned on the mounting surface with each of three gyro axes, which are normal to each other, inclined to the axis of oscillation so that oscillation of the mounting ring causes an angular displacement of each of the gyro axes.

A further object is to provide a new and improved mount of the type described including means for oscillating the mounting ring.

Another object is to provide a new and improved mount of the type described including means for locking the mounting ring in a central reference position when the means for oscillating is disabled.

A more specific object is to provide a new and improved mount of the character mentioned including a single clutch member in the form of a lock and drive plunger selectively engageable with a detent means for locking the mounting ring or with a drive means for oscillating the ring.

Other objects and advantages will become readily apparent from the following detailed description taken in connection with the accompanying drawings, in which:

FIG. 1 is a top perspective view of a simple model designed to illustrate the principles involved in the present invention;

FIG. 2 is a top plan view of the device illustrated in FIG. 1, with one of the cubic blocks angularly displaced relative to the other for the purpose of showing the inclination of a movable axis relative to a stationary axis;

FIG. 3 is a rear elevational view of the device as illustrated in FIG. 2;

FIG. 4 is a side elevational view of the device as illustrated in FIG. 2;

FIG. 5 is a top plan view, partly broken away and in section illustrating a mount embodying the principles of the present invention;

FIG. 6 is a vertical sectional view taken at about the line 6—6 of FIG. 5;

FIG. 7 is a fragmentary sectional view taken at about the line 7—7 of FIG. 5 illustrating a detent roller;

FIG. 8 is a fragmentary sectional view taken about the line 8—8 of FIG. 5, illustrating a support for a detent roller;

FIG. 9 is a fragmentary sectional view taken at about the line 9—9 of FIG. 5 illustrating the mounting of a reciprocable shaft for oscillating the mounting ring;

FIG. 10 is an end elevational view taken from the right of FIGS. 5 and 6, and partly in section to illustrate the drive mechanism for oscillating the mounting ring; and FIG. 11 is a fragmentary sectional view taken at about the line 11—11 of FIG. 10.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

The device or mount of the present invention may be described as a hinge, one side of which is attached to the missile structure and the other side of which is attached to the gyro system. The axis of the hinge is mounted at chosen angles to the three axes of the missile and gyro system, so that angular rotation of the gyro system housing about the hinge axis provides the desired angular rotation of the three principal axes of the gyro system. The angular position of the hinge axis relative to the three principal axes of the gyro system may be chosen such that equal angular displacement occurs in each of the three gyro axes for a given angular rotation about the hinge axis.

The principles involved will be understood upon reference to FIGS. 1-4 which demonstrate the hinge principle. In these figures, two substantially cubic blocks 10 and 11 are pivotally joined by a bolt 12 which passes through the block 11 and is threaded into the block 10. For purposes of explanation, let the block 10 represent the missile structure, the block 11 represent the gyro system, and the bolt 12 represent the hinge axis connecting the missile structure and the gyro system. Three faces of each block which are normal to each other pair may be regarded as containing the three axes of the missile structure and the gyro system. It is not necessary that the three gyro axes intersect each other, or that the hinge axis intersect the gyro axes. In FIG. 1, the blocks are relatively positioned so that the three axes of the block 11 are parallel respectively to the three axes of the block 10. This is illustrated by the obvious parallelism between the line XI on the block 10 and the line XII on the block 11, and between the line ZI on the block 10 and the line ZII on the block 11. Obviously, a rear view of the structure illustrated in FIG. 1 would show line YI and YII to be parallel.

Referring to FIG. 2, where the block 11 has been rotated about the hinge axis relative to the block 10 it will be seen that the line XII has been angularly displaced relative to the line XI. Similarly, referring to FIG. 3 it will be seen that the line YII has been angularly displaced relative to the line YI, and in FIG. 4 the line ZII is angularly displaced relative to the line ZI. Thus, with a hinge axis inclined to each of the three principal axes, angular displacement of the one block relative to the other produces simultaneous angular displacement of the three principal axes of one block relative to the three principal axes of the other block, and if the hinge axis is chosen as a body diagonal, as illustrated, or an axis parallel to the body diagonal, that is, equally inclined to each of the three principal axes, the angular displacement of the three axes is equal. This principle is embodied in the mount illustrated in FIGS. 5-11.

It should be understood that if it is desired that the displacement of the three axes of the gyro system not be equal for any given displacement of the gyro housing about the hinge axis, any desired combination of amplitude ratios may be obtained by placing the hinge axis at a suitable position not coincident with the body diagonal or parallel thereto. Also, it will be understood that it is not necessary that the hinge axis pass through the gyro system but may be displaced to any convenient mutually parallel position in space and not affect the desired angular relationship of any one axis relative to the other two axes of the gyro system.

If, utilizing the mount of this invention, a known angular disturbance is given to the gyro system housing by a suitable drive mechanism, and a signal or signals produced by the drive mechanism is compared to a signal or signals produced by the gyro system, the accuracy of the gyro system may be checked prior to launching of a missile as a part of the pre-launching checkout.

While the mount is described herein as particularly adapted for use in a missile, it should be understood that it is not limited to such an application, but may be mounted in other places, such as ground support equipment, laboratory checking devices and the like.

Referring now to FIGS. 5-11, the mount may be described in general as including a base 20, a mounting ring 21 pivotable on the base about an axis inclined to the axis of the ring, a detent means 22 on the base, a drive mechanism 23 on the base, and a clutch mechanism 24 on the mounting ring in the form of a lock and drive plunger selectively engageable with the detent means to lock the mounting ring in a central reference position on the base or alternatively engageable with the drive mechanism to oscillate the mounting ring relative to the base several degrees in opposite direction from the reference position.

The base 20 comprises a generally annular adapter plate 26 which has at diametrically opposite positions thereon a pair of bearing supports, one, 27, extending downwardly at the left as viewed in FIG. 5 and one, 28, extending upwardly at the right as viewed in FIG. 5. At the lower end, the bearing support 27 is provided with a precision roller bearing 30, and at the upper end the bearing support 28 is provided with a matched set of preloaded duplex ball bearings 31. The bearings 30 and 31 are aligned on a common axis inclined to and intersecting the axis 37 of and the planes of the adapter plate 26 and the mounting ring 21. Concentrically disposed within the annular adapter plate 26 is the annular mounting ring 21 which is provided at the left with a depending extension 33 (FIG. 6) having a trunnion 34 at the lower end thereof. At the right, the mounting ring includes an upward extension 35 reinforced by brace rods 35a and provided with a trunnion 36, the trunnions 34 and 36 being aligned on a common axis and mounted respectively in the bearings 30 and 31. In this manner, the mounting ring is supported for oscillation about an axis inclined to and intersecting the axis 37 and the planes of the adapter plate and the mounting ring.

The base 20 is provided at the right as viewed in FIG. 5 with a pair of pedestals 40 (FIGS. 5 and 10) which provide a means for mounting the base suitably in a missile or other support. The pedestals may be suitably secured in position in the missile as by screws or bolts illustrated at 41.

The mounting ring 21 is provided with a planar upper surface or with a series of raised surfaces as at 43 and 44 (FIG. 6) in a common plane for supporting a gyro system housing such as that illustrated in broken lines at 45 (FIGS. 5 and 6). As illustrated, the housing has a generally cylindrical shape to fit within the mounting ring and includes one or more outwardly projecting flanges as at 46 and 47 adapted to rest on surfaces such as those at 43 and 44 on the mounting ring. The flanges of the gyro system housing may be secured in position as by bolt or screw means illustrated at 48.

It will be understood that the base 20 represents one side of a hinge while the mounting ring 21 represents the other side of the hinge so that a gyro system housing suitably supported on the mounting ring may be tilted or oscillated about the hinge axis to simultaneously displace the three principal axes of the gyro system. One axis of the gyro system may be represented by the axis 37 (FIG. 6), another axis, normal to the first, would lie in a plane parallel to the plane of the mounting ring and may be represented, for example, by the line 50 (FIG. 5) while the third may be represented, for example, by the line 51. It will be understood that the gyro system housing may be suitably positioned in the mounting ring with both of the axes 50 and 51 inclined to the hinge axis provided by bearings 30 and 31.

Means are provided for normally maintaining the mounting ring in a central reference position wherein the mounting surfaces 43 and 44 lie in a plane parallel to the plane of the adapter plate 26, and this means includes a pair of detent rollers on the base 20 as at 55, at opposite sides of a lateral extension 56 on the mounting ring. Cooperating with the detent rollers 55 is a radially reciprocable lock and drive plunger 57 on the lateral extension 56. As seen best in FIG. 6, the lateral extension 56 is provided with a bore 58 which houses the plunger 57. The plunger is surrounded by a spring 59 which bears at one end against a shoulder 60 in the bore 58 and at the other end against a collar 61 secured on the plunger, so that the spring normally maintains the plunger in a retracted locking position.

In the retracted position, a pair of lateral projections 63 (FIG. 5) on the plunger engage detent rollers 55 respectively to properly center the mounting ring in the central reference position. The plunger 57 is movable from the retracted locking position illustrated toward the left as viewed in FIGS. 5 and 6 to a drive position wherein the projections 63 are disengaged from the detent rollers 55 and allow oscillation of the mounting ring in opposite directions from the central reference position. Movement of the plunger to the drive position is effected by means of a solenoid 65 mounted on the lateral extension 56 and having a core 66. The core 66 has a pin and slot connection 67 with a lever 68 pivoted at 69 on the extension 56 and in turn having a pin and slot connection 70 with the lock plunger 57. Upon energization of the solenoid 65, the core 66 is moved toward the right to shift the plunger 57 toward the left.

The detent rollers 55 are mounted in suitable needle bearings as illustrated at 72 in FIG. 7, and the bearings 72 are in turn supported on a bracket 73 resiliently mounted on the base 20. Preferably, each bracket 73 is somewhat yoke shaped and includes end portions as at 73a secured to the base as by bolts 75 (FIG. 8) and a central portion secured to the base 20 as by a bolt 76 (FIG. 5). A resilient gasket 77 is positioned between each bracket 73 and the adjacent portion of the base 20, and the bolt 76 is surrounded by a spring 78 seated in the base and urging the bracket outwardly. In this manner, the detent rollers 55 are resiliently urged toward each other and yieldable upon engagement by the projections 63 on the lock plunger 57. Preferably, the rollers 55 and projections 63 are formed with complementary convex and concave surfaces respectively as at 80 which require a limited over center snap action when the projections are moved to and from the retracted locking position.

The drive means 23 for oscillating the mounting ring on the base comprises a motor-tachometer unit 82 (FIG. 10) operable at a contant but preferably variable speed and having an output connected to a suitable antibacklash gearbox 83 which transmits power through an antibacklash coupling 84 to a crank shaft 85 having an eccentric portion 86. The eccentric portion 86 constitutes the rotary part of a scotch yoke mechanism which includes a yoke 87 (FIG. 11) engaging the eccentric 86 and connected as at 88 to a reciprocable drive shaft 89. The drive shaft 89 carries a drive collar 90 having a transverse groove 91 adapted for receiving the rounded head portion 57a of the lock and drive plunger 57 so that as the drive shaft 89 reciprocates in a straight line motion, the lock and drive plunger on the mounting ring extension, and in turn the mounting ring, oscillate back and forth in opposite directions from the central reference position, the head of the plunger 57 being permitted to move up and down in the slot 91 as the collar reciprocates.

The crank shaft 85 is supported at the lower end (FIG. 10) by a set of matched, spaced, preloaded duplex ball bearings as at 95 (FIG. 10) and at the upper end by a deep groove ball bearing 96, which together prevent any looseness in the crank shaft assembly. Looseness in the scotch yoke is prevented by means of an interference fit across the yoke normal to the reciprocating shaft 89 provided by a pair of bearings on the eccentric portion 86 including an upper bearing 97 which engages an upper left-hand portion of the yoke 87 and a lower bearing 98 which engages a lower right-hand portion of the yoke. This enables the bearings to roll in opposite directions and permits pure rolling with no looseness. The reciprocating drive shaft 89 is supported on linear ball bearings as at 100 (FIG. 5) and 101 (FIG. 9) which insure against looseness of this shaft.

In operation, when the solenoid 65 is energized, it forces the lock and drive plunger 57 forward against the bias of spring 59 and into the seat 91 of the collar 90 on the reciprocating drive shaft 89. The seat of the drive collar is preferably covered with a dry lubricant. A preferred system preferably includes a common switch for energizing the solenoid 65 and a time delay relay which completes a circuit for energizing the motor-tachometer unit 82. The motor thus drives the crank shaft 85 which in turn drives the reciprocating shaft 89 through the scotch yoke mechanism. This imparts a simple harmonic motion to the mounting ring and this motion in turn imposes a simple harmonic signal, a sinusoidal signal, on the three gyroscopes in the gyro system housing. Preferably, a resolver 105 is mounted on the base to be driven by the end 106 of the crank shaft 85, and by comparing the output signals of the resolver and the gyros, the performance of the gyro package can be determined.

When the solenoid 65 is de-energized, or whenever power failure occurs, the lock and drive plunger 57 is forced to a retracted lock position by the spring 59 and the mounting ring is accordingly centered by engagement of the projections 63 on the lock plunger with the detent rollers 55 on the base. The spring 59 is sufficiently strong to snap the projections 63 overcenter on the rollers 55.

In a preferred embodiment, a fixture or mount of the type described herein is intended for oscillating a gyro package of approximately 40 pounds about 4° in either direction from the reference position at a frequency of oscillation variable from about .1 to 4 cycles per second under control of a remotely located panel (not shown). All looseness in the hinge axis is prevented by bearings provided at 30 and 31, which preclude any possibility of either axial or radial looseness in the mount and allow motion of the mounting ring to take place only about the hinge axis. Looseness in the drive mechanism is prevented by the means illustrated in FIGS. 9–11. An important advantage of the present construction is provided by the "fail-safe" locking feature whereby the mounting ring is automatically locked in the central reference position in the event of power failure or failure of the control panel.

I claim:

1. A mount for a gyro system housing comprising, a base, a mounting ring having a generally planar annular mounting surface for supporting a gyro system housing, means mounting the ring on the base for oscillation about an axis inclined to the plane of the mounting surface, means connected between the base and the ring for oscillating the ring about said axis, and means for automatically locking the ring in a predetermined reference position on the base when the means for oscillating is disabled.

2. A mount for a gyro system housing, comprising, a base, a generally planar mounting ring for supporting a gyro system housing with the axis of the housing coincident with the axis of the ring, means mounting the ring on the base for oscillation about an axis inclined to the axis of and the plane of the mounting ring, selectively operable means for locking the ring on the base, and selectively operable means connected between the base and the ring for oscillating the ring when unlocked.

3. A mount for a gyro system housing, comprising, a base, means for attaching the base to a support, an annular adapter plate on the base, bearing supports at diametrically opposite positions on the adapter plate, bearings in said bearing supports aligned on a common axis inclined to and intersecting the axis of the adapter plate, a mounting ring concentric with the adapter plate, means for securing a gyro system housing on the mounting ring, trunnion supports at diametrically opposite positions on the mounting ring one extending downwardly therefrom adjacent the lower bearing support and the other extending upwardly therefrom adjacent the upper bearing support, trunnions on the trunnion supports aligned on said common axis and mounted respectively in the bearings, and means connected between the base and the ring for oscillating the ring relative to the base several degrees in opposite directions from a central reference position.

4. A mount for a gyro system housing, comprising, a base, means for attaching the base to a support in a missile or the like, an annular adapter plate on the base, bearing supports at diametrically opposite positions on the adapter plate, one extending downwardly therefrom and the other extending upwardy therefrom, bearings in the lower end of said one bearing support and in the upper end of said other bearing support aligned on a common axis inclined to and intersecting the axis of and the plane of the adapter plate, a mounting ring concentric with the adapter plate, means for securing a gyro system housing on the mounting ring, trunnion supports at diametrically opposite positions on the mounting ring one extending downwardly therefrom adjacent the lower bearing support and the other extending upwardly therefrom adjacent the upper bearing support, trunnions on the trunnion supports aligned on said common axis and mounted respectively in the bearings, a lateral extension on the mounting ring, cooperable means on the base and the lateral extension selectively operable for locking the ring relative to the base in a plane parallel with the plane of the adapter plate, and cooperable means on the base and the extension selectively operable for oscillating the ring relative to the base.

5. A mount for a gyro system housing, comprising, a base, a generally planar mounting ring for supporting a gyro system housing with the axis of the housing coincident with the axis of the ring, means mounting the ring on the base for oscillation, a lateral extension on the mounting ring, detent means on the base, drive means on the base, and a clutch member on the extension selectively engageable with the detent means to lock the ring in a central reference position on the base or with the drive means to oscillate the ring between opposite limits equidistant from the reference position.

6. A mount for a gyro system housing, comprising, a base, a generally planar mounting ring for supporting a gyro system housing with the axis of the housing coincident with the axis of the ring, means mounting the ring on the base for oscillation about an axis inclined to the axis of the mounting ring, a lateral extension on the mounting ring, a radially disposed lock plunger slidably mounted in said extension for movement between a retracted lock position and an advanced unlock position, means normally maintaining the plunger in the retracted position, detent means on the base engageable by the plunger when retracted thereby to maintain the mounting ring in a central reference position, means connected with the plunger to move the same to the advanced position, and cooperable means on the base and the extension for oscillating the ring relative to the base when unlocked.

7. A mount for a gyro system housing, comprising, a base, a generally planar mounting ring for supporting a gyro system housing with the axis of the housing coincident with the axis of the ring, means mounting the ring on the base for oscillation about an axis inclined to and intersecting the axis of and the plane of the mounting ring, a lateral extension on the mounting ring, a radially disposed lock plunger slidably mounted in said extension for movement between a retracted lock position and an advanced unlock position, spring means normally maintaining the plunger in the retracted position, a pair of opposed detents on the base at opposite sides of the lock plunger, means yieldably urging the detents toward each other, a pair of lateral projections on the lock plunger engageable respectively with the detents when the plunger is retracted thereby to center the plunger between the detents and maintain the mounting ring in a central reference position, complementary concave and convex surfaces respectively on the detents and lock plunger projections providing an over center snap action when the plunger is moved to and from retracted position, a solenoid mounted on the mounting ring extension and connected with the plunger to move the same to unlock position, and cooperable means on the base and the extension for oscillating the ring relative to the base when unlocked.

8. A mount for a gyro system housing, comprising, a base, a generally planar mounting ring for supporting a gyro system housing with the axis of the housing coincident with the axis of the ring, means mounting the ring on the base for oscillation about an axis inclined to the axis of the mounting ring, a lateral extension on the mounting ring, a radially disposed drive plunger slidably mounted in said extension for movement between a retracted non-drive position and an advanced drive position, means normally maintaining the plunger in the retracted position, means connected with the plunger to move the same to drive position, a drive motor on the base, a rotary-to-reciprocating drive mechanism connected to the motor including a drive shaft reciprocable transverse to the drive plunger and engageable by the plunger when extended to drive position thereby to oscillate the mounting ring.

9. A mount for a gyro system housing, comprising, a base, a generally planar mounting ring for supporting a gyro system housing with the axis of the housing coincident with the axis of the ring, means mounting the ring on the base for oscillation about an axis inclined to and intersecting the axis of and the plane of the mounting ring, a lateral extension on the mounting ring, a radially disposed drive plunger slidably mounted in said extension for movement between a retracted non-drive position and an advanced drive position, spring means normally maintaining the plunger in the retracted position, a solenoid mounted on the mounting ring extension and connected with the plunger to move the same to drive position, a drive mechanism on the base including a drive motor, a crank shaft driven by the motor, a scotch yoke engaging an eccentric on the crank shaft, a drive shaft connected to the yoke and reciprocable transverse to the drive plunger, and a drive collar on the drive shaft engageable by the plunger when extended to drive position thereby to oscillate the mounting ring, said collar having a transverse elongate seat and said plunger having a head receivable in the seat enabling relative movement therebetween while the drive shaft is reciprocated and the mounting ring is oscillated.

10. A mount for a gyro system housing, comprising, a base, a generally planar mounting ring for supporting a gyro system housing with the axis of the housing coincident with the axis of the ring, means mounting the ring on the base for oscillation about an axis inclined to and intersecting the axis of and the plane of the mounting ring, a lateral extension on the mounting ring, a radially disposed lock and drive plunger slidably mounted in said extension for movement between a retracted lock position and an advanced drive position, means normally maintaining the plunger in the retracted position, a pair of opposed detents on the base at opposite sides of the lock plunger, a pair of lateral projections on the lock plunger engageable respectively with the detents when the plunger is retracted thereby to center the plunger between the detents and maintain the mounting ring in a plane parallel to the adapter plate, means on the mounting ring extension connected with the plunger to move the same to drive position, a drive mechanism on the base including a drive motor, a crank shaft driven by the motor, a scotch yoke engaging an eccentric on the crank shaft, a drive shaft connected to the yoke and reciprocable transverse to the lock and drive plunger, and a drive collar on the drive shaft engageable by the plunger when extended to drive position thereby to oscillate the mounting ring.

11. A mount for a gyro system housing, comprising, a base, means for attaching the base to a support, an annular adapter plate on the base, bearing supports at diametrically opposite positions on the adapter plate having bearings aligned on a common axis inclined to and intersecting the axis of the adapter plate, a mounting ring concentric with the adapter plate, means for securing a gyro system housing on the mounting ring, trunnions at diametrically opposite positions on the mounting ring aligned on said common axis and mounted respectively in the bearings, a lateral extension on the mounting ring, a radially disposed lock and drive plunger slidably mounted in said extension for movement between a retracted lock position and an advanced drive position, means normally maintaining the plunger in the retracted position, a pair of opposed detents on the base at opposite sides of the lock plunger, a pair of lateral projections on the lock plunger engageable respectively with the detents when the plunger is retracted thereby to center the plunger between the detents and maintain the mounting ring in a plane parallel to the adapter plate, means connected with the plunger to move the same to drive position, a drive mechanism on the base including a drive motor, a crank shaft driven by the motor, a scotch yoke engaging an eccentric on the crank shaft, a drive shaft connected to the yoke and reciprocable transverse to the lock and drive plunger, and a drive collar on the drive shaft engageable by the plunger when extended to drive position thereby to oscillate the mounting ring.

References Cited in the file of this patent

UNITED STATES PATENTS

| | | |
|---|---|---|
| 1,518,762 | Tanner | Dec. 9, 1924 |
| 2,864,255 | Stern et al. | Dec. 16, 1958 |
| 2,953,858 | Wrigley et al. | Sept. 27, 1960 |

FOREIGN PATENTS

| | | |
|---|---|---|
| 1,099,924 | France | Mar. 30, 1955 |